No. 803,975. PATENTED NOV. 7, 1905.
H. BICK.
EYEGLASS HOLDER.
APPLICATION FILED AUG. 12, 1905.

Witnesses:
Arthur Juncke
Fred. Unfrucht

Inventor:
Harry Bick
by Frank v. Briesen Att'y.

UNITED STATES PATENT OFFICE.

HARRY BICK, OF NEW YORK, N. Y.

EYEGLASS-HOLDER.

No. 803,975.　　　　Specification of Letters Patent.　　　　Patented Nov. 7, 1905.

Application filed August 12, 1905. Serial No. 273,861.

*To all whom it may concern:*

Be it known that I, HARRY BICK, a citizen of the United States, and a resident of New York city, Bronx, county and State of New York, have invented new and useful Improvements in Eyeglass-Holders, of which the following is a specification.

This invention relates to an eyeglass-holder which is provided with a pivoted bail that effects a firm seating of the holder upon the nose by preventing it from tilting forward.

Figure 1:
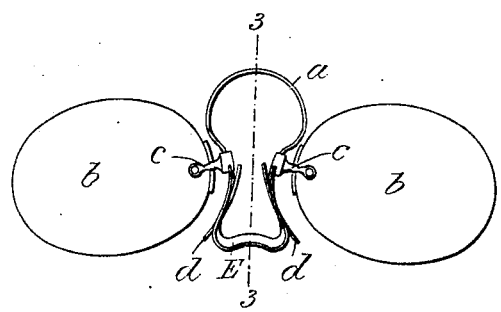
Figure 2:
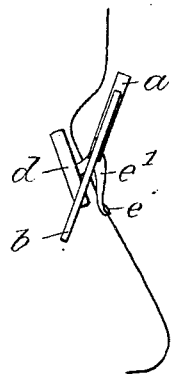
Figure 3:
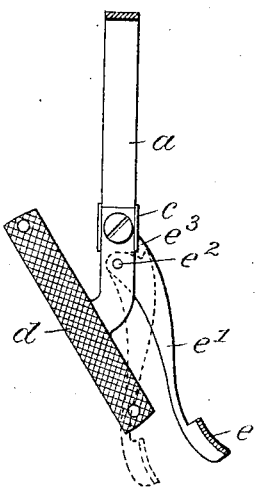
Figure 4:
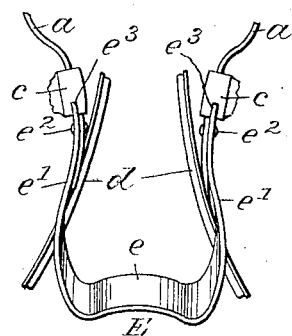

In the accompanying drawings, Figure is a front view of my improved eyeglass-holder; Fig. 2, a side view thereof; Fig. 3, an enlarged longitudinal section on line 3 3, Fig. 1; and Fig. 4, an enlarged front view of part of the holder.

The letter $a$ indicates the bow-spring of an eyeglass-holder, $b$ indicates the glasses, $c$ the studs, and $d$ the nose-guards, all as usual.

E indicates a bail composed of a bulged cross-piece $e$ and of two rearwardly-extending shanks $e'$. These shanks are turned up at right angles to the cross-piece, so that while the cross-piece is adapted to lie flat upon the nose the shanks $e'$ project upwardly from the same. The shanks $e'$ are pivoted at $e^2$ to the guards $d$. The rear ends of shanks $e'$ are notched to form abutments $e^3$, adapted to engage studs $c$, and thereby limit the upward oscillation of the bail.

When the holder is not in use, the bail E will swing downward (dotted lines, Fig. 3) to fold flat against the guards and permit the holder to be incased. When the holder is used, the bail will be swung upward by engagement with the bridge of the nose until abutments $e^3$ contact with studs $c$. In this way the bail will, with its bulged cross-piece $e$, so straddle the nose that any forward tilting of the eyeglasses is prevented.

What I claim is—

1. An eyeglass-holder provided with a spring, a pair of nose-guards, and a bail pivoted to said guards, substantially as specified.

2. An eyeglass-holder provided with a spring, a pair of nose-guards, and a bail pivoted thereto and composed of a bulged cross-piece and rearwardly-extending arms that are turned up at right angles to the cross-piece, substantially as specified.

3. An eyeglass-holder provided with a spring, a pair of studs, a pair of nose-guards, and a bail pivoted to said guards and having abutments that are adapted to engage the studs, substantially as specified.

Signed by me at New York city, (Manhattan,) New York, this 11th day of August, 1905.

HARRY BICK.

Witnesses:
　FRANK V. BRIESEN,
　FRED. UNFRICHT.